(12) United States Patent
Doty et al.

(10) Patent No.: US 7,186,987 B1
(45) Date of Patent: Mar. 6, 2007

(54) ORGANIC MATERIALS AND DEVICES FOR DETECTING IONIZING RADIATION

(75) Inventors: F. Patrick Doty, Livermore, CA (US); Douglas A. Chinn, Livermore, CA (US)

(73) Assignee: Sandia National Laboratories, Livermore, CA (US)

( * ) Notice: Subject to any disclaimer, the term of this patent is extended or adjusted under 35 U.S.C. 154(b) by 993 days.

(21) Appl. No.: 09/863,128

(22) Filed: May 22, 2001

(51) Int. Cl.
*G01T 3/00* (2006.01)
*G01T 3/08* (2006.01)

(52) U.S. Cl. .............................. 250/390.01; 250/370.05

(58) Field of Classification Search ..............................
250/390.01–390.12, 370.01–370.15, 214.1,
250/361 R; 252/600
See application file for complete search history.

(56) References Cited

U.S. PATENT DOCUMENTS

| | | | | |
|---|---|---|---|---|
| 2,321,635 A * | 6/1943 | Taylor | ...................... | 264/288.8 |
| 2,730,513 A * | 1/1956 | Balley et al. | ................ | 524/296 |
| 2,829,264 A * | 4/1958 | Garrison | ................. | 250/361 R |
| 3,048,564 A * | 8/1962 | Heffelfinger | ................. | 528/281 |
| 3,354,023 A | 11/1967 | Dunnington et al. | ........ | 428/220 |
| 3,513,317 A * | 5/1970 | Binks et al. | .............. | 250/214.1 |
| 3,600,355 A * | 8/1971 | Cyba | ........................... | 523/445 |
| 3,808,494 A | 4/1974 | Hayashi et al. | .............. | 313/103 |
| 3,824,220 A * | 7/1974 | Smith et al. | ................. | 528/408 |
| 3,849,345 A * | 11/1974 | Snavely | ....................... | 252/511 |
| 4,093,562 A | 6/1978 | Kishimoto | ................... | 252/511 |
| 4,445,036 A * | 4/1984 | Selph | ..................... | 250/370.05 |
| 4,641,037 A * | 2/1987 | Butler et al. | ............ | 250/390.02 |
| 4,857,259 A * | 8/1989 | Bartko et al. | ............... | 376/154 |
| 4,910,149 A * | 3/1990 | Okube et al. | .......... | 250/370.07 |
| 4,975,222 A * | 12/1990 | Yoshino et al. | .............. | 252/586 |
| 5,030,827 A | 7/1991 | Powell | ..................... | 250/338.3 |
| 5,079,334 A * | 1/1992 | Epstein et al. | .............. | 528/210 |
| 5,100,762 A | 3/1992 | Tanaka et al. | ........... | 430/270.1 |
| 5,137,799 A * | 8/1992 | Kaempf et al. | .......... | 430/270.1 |

(Continued)

OTHER PUBLICATIONS

Beckerle, P.; Ströbele, H.; "Charged particle detection In organic semiconductors" *Nuclear Instruments and Methods in Physics Research A*, v.(449) 2000, pp. 302-310.

*Primary Examiner*—Gregory J. Toatley, Jr.
*Assistant Examiner*—Gordon J. Stock, Jr.
(74) *Attorney, Agent, or Firm*—Donald A. Nissen

(57) ABSTRACT

A π-conjugated organic material for detecting ionizing radiation, and particularly for detecting low energy fission neutrons. The π-conjugated materials comprise a class of organic materials whose members are intrinsic semiconducting materials. Included in this class are π-conjugated polymers, polyaromatic hydrocarbon molecules, and quinolates. Because of their high resistivities ($\geq 10^9$ ohm·cm), these π-conjugated organic materials exhibit very low leakage currents. A device for detecting and measuring ionizing radiation can be made by applying an electric field to a layer of the π-conjugated polymer material to measure electron/hole pair formation. A layer of the π-conjugated polymer material can be made by conventional polymer fabrication methods and can be cast into sheets capable of covering large areas. These sheets of polymer radiation detector material can be deposited between flexible electrodes and rolled up to form a radiation detector occupying a small volume but having a large surface area. The semiconducting polymer material can be easily fabricated in layers about 10 µm to 100 µm thick. These thin polymer layers and their associated electrodes can be stacked to form unique multi-layer detector arrangements that occupy small volume.

23 Claims, 2 Drawing Sheets

U.S. PATENT DOCUMENTS

| | | | |
|---|---|---|---|
| 5,206,525 A * | 4/1993 | Yamamoto et al. | 257/40 |
| 5,241,415 A * | 8/1993 | Argentieri et al. | 359/395 |
| 5,243,193 A | 9/1993 | Suontausta et al. | 250/361 R |
| 5,324,827 A * | 6/1994 | Camberlin et al. | 534/854 |
| H1386 H * | 12/1994 | Testa et al. | 525/437 |
| 5,454,880 A * | 10/1995 | Sariciftci et al. | 136/263 |
| 5,500,534 A * | 3/1996 | Robinson et al. | 250/385.1 |
| 5,504,323 A * | 4/1996 | Heeger et al. | 250/214.1 |
| 5,523,555 A * | 6/1996 | Friend et al. | 250/214 R |
| 5,569,699 A * | 10/1996 | Barthe et al. | 524/486 |
| 5,663,238 A * | 9/1997 | Wang et al. | 525/285 |
| 5,691,089 A | 11/1997 | Smayling | 430/5 |
| 5,698,048 A * | 12/1997 | Friend et al. | 136/263 |
| 5,876,586 A * | 3/1999 | Fukushima et al. | 205/414 |
| 5,907,156 A * | 5/1999 | Nishizawa et al. | 250/370.01 |
| 5,958,302 A * | 9/1999 | Cunningham et al. | 252/500 |
| 6,069,353 A * | 5/2000 | Jung et al. | 250/214.1 |
| 6,106,742 A * | 8/2000 | Argyropoulos et al. | 252/511 |
| 6,174,420 B1 * | 1/2001 | Hodges et al. | 204/403.14 |
| 6,211,524 B1 * | 4/2001 | Vardeny et al. | 250/458.1 |
| 6,278,055 B1 | 8/2001 | Forrest et al. | 136/263 |
| 6,278,117 B1 | 8/2001 | Bardash | 250/370.07 |
| 6,300,612 B1 * | 10/2001 | Yu | 250/208.1 |
| 6,500,544 B1 * | 12/2002 | Tiitu et al. | 428/413 |
| 6,524,760 B1 * | 2/2003 | Ikeuchi et al. | 430/41 |
| 2003/0025084 A1 * | 2/2003 | Honda et al. | 250/370.11 |
| 2004/0227095 A1 * | 11/2004 | Gerstenmayer et al. | 250/370.1 |

\* cited by examiner

ORGANIC MATERIALS AND DEVICES FOR DETECTING IONIZING RADIATION

STATEMENT OF GOVERNMENT INTEREST

This invention was made with Government support under contract no. DE-AC04-94AL85000 awarded by the U.S. Department of Energy to Sandia Corporation. The Government has certain rights in the invention.

BACKGROUND OF THE INVENTION

The present invention is directed generally to a class of organic semiconductor materials useful for the direct detection of ionizing radiation namely, $\pi$-conjugated molecules, and particularly $\pi$-conjugated polymers and polyaromatic hydrocarbons. The invention further relates to apparatus for detecting and measuring ionizing radiation.

Generally, semiconductor detectors of nuclear radiation operate by exploiting the fact that incident radiation, by interaction in the detector material, will create a charge pulse consisting of holes and electrons that can be separated under the influence of an electric field and the current detected by an external circuit.

Because they are readily available, radiation detector materials are generally semiconductor materials such as Si or Ge with lithium introduced into the semiconductor material so that it behaves as an extrinsic semiconductor. However, these materials have less than ideal band gap widths and high dark currents making them unattractive candidates for room temperature radiation detection devices. Further, the need to keep such Si(Li) and Ge detectors cooled to cryogenic temperatures poses significant limitations on the use of these materials in many applications, particularly where portability is desired.

Certain nonmetallic, crystalline solids such as mercuric iodide ($HgI_2$), lead iodide ($PbI_2$), thallium bromide (TlBr), indium iodide (InI), thallium bromoiodide (TlBrI), mercuric bromoiodide (HgBrI), and cadmium zinc telluride (CdZnTe) are particularly useful as materials for room temperature radiation detection devices. However, for high radiation detection efficiency it is necessary to have materials that exhibit very low leakage currents (e.g., $<10^{-7}$ A at electric fields of about 1000 V/cm to about 3000 V/cm) and thus, high electrical resistivity (i.e., $1/\sigma \geq 10^9$ ohm·cm). One of the primary problems associated with nonmetallic, crystalline semiconducting materials lies in the presence of charge trapping defect sites and electrical instabilities caused by impurities in the starting material or introduced during subsequent processing. In addition, electrically active impurities may move under the influence of the applied field leading to unpredictable and variable electrical properties including high dark current and spectral distortions. The electrical resistivity of a material is a measure of its purity and defect concentration in the material and for most semiconducting material resistivities much greater than $10^8$ ohm cm require semiconducting materials of the very highest purity and are thus, very difficult to achieve (M. Hage-Ali and P. Siffert, Semiconductors for Room Temperature Nuclear Detector Applications, 43, 245, 1995).

An alternative approach to radiation detection, particularly for the detection of neutrons, is the use of a scintillator material that emits visible light when exposed to radiation. The strong interaction of neutrons with hydrogen containing materials makes them particularly desirable as detector materials for neutron measurements. One method of imaging neutrons employs track detectors such as plastic scintillating fiber bundles externally coupled to photomultiplier tubes or photodiodes to record light and to determine the momentum of recoil protons generated within the scintillator. This approach has inherently high sensitivity due to the strong interaction with the protons of the plastic scintillator material and has been demonstrated for neutron energies down to about 14 MeV. However, charges generated by ionization of the plastic scintillator material must diffuse to specific sites that promote radiative recombination. Losses due to non-radiative recombination, isotropic emission of the scintillation light, attenuation and reflection at interfaces, and spectral mismatch with the photodetector can result in a signal that can be difficult to detect. Further, tracking recoil protons from typical fission neutrons (neutrons having energies between about 1 MeV to about 10 MeV) requires spatial resolution on the order of about 10 µm to about 100 µm, which is very difficult to achieve by this approach due to reduction of active volume and light output for reduced fiber diameter in the bundles (typical diameters are 50 cm to 500 µm).

Organic materials and particularly organic polymer materials and polyaromatic hydrocarbons are known in the art to possess very high resistance to the flow of direct current and thus should be desirable as a medium for the detection of ionizing radiation. Moreover, as discussed above, the interaction of ionizing radiation, neutrons, with the hydrogen of organic materials makes these materials particularly suitable as detector materials for detection of ionizing radiation, providing the organic materials possess a high enough electrical resistivity.

SUMMARY OF THE INVENTION

The present invention is directed to material for detecting ionizing radiation, and particularly for detecting neutrons, and apparatus pertaining thereto for detecting and measuring ionizing radiation. The detection material comprises a class of organic materials, $\pi$-conjugated molecules, whose members are intrinsic semiconducting materials and can include $\pi$-conjugated polymers, polyaromatic hydrocarbon molecules capable of charge transfer reactions such as naphthalene, anthracene, and rubrene, and quinolates.

The $\pi$-conjugated semiconducting polymer material that comprise the invention possess advantages over conventional radiation detection materials, namely:

Direct electronic detection of fission neutrons is made possible for the first time due to the strong interaction of fast neutrons with the hydrogen of the polymer.

The chemical composition of the polymer material enables electronic dosimeters that represent tissue thereby providing for accurate determination of true biological hazard.

By tailoring the chemical composition, the polymer material can be designed to provide a high degree of radiation specificity.

Inexpensive radiation detectors can be readily fabricated by methods well known in the art.

Unique structures, such as castings with embedded electrodes can be easily produced thereby enabling new detector designs and methods for tracking, imaging, and spectroscopy of ionizing radiation.

Accordingly, it is an object of this invention to overcome the difficulties associated with the use of metallic semiconducting materials and plastic providing a class of high resistivity organic semiconductor materials useful for detection and tracking of radioactive particles, $\pi$-conjugated molecules.

Another object is to provide apparatus utilizing the inventive material for the direct electronic detection of fission neutrons.

Yet another object is to provide for electronic tissue equivalent dosimeters.

A further object is to provide radiation detectors having a high degree of sensitivity for specific types of radiation.

These and objects of the present invention will become apparent from the description below and accompanying drawings.

BRIEF DESCRIPTION OF THE DRAWINGS

The accompanying drawings, which are incorporated in and form part of the specification, illustrate the present invention and, together with the description, explain the invention. In the drawings like elements are referred to by like numbers.

DETAILED DESCRIPTION OF THE INVENTION

The invention is directed to a unique class of organic semiconducting polymer materials, α-conjugated molecules, and materials made therefrom, useful for the direct detection of ionizing radiation. These materials are characterized by a very high electrical resistivity typically ($1/\sigma \geq 10^9$ ohm·cm), and thus avoid leakage current problems associated with conventional semiconductor or crystalline solid radiation detection materials. These, π-conjugated materials can include π-conjugated polymers and polyaromatic hydrocarbon molecules capable of charge transfer reactions such as naphthalene, anthracene, and rubrene, and quinolates. Interaction of ionizing radiation with these organic materials produces electron-hole pairs, thereby providing for direct electronic detection by means of electrodes and associated means for providing an electric field across the π-conjugated material, such as a power supply, thus eliminating the difficulties associated with the use of scintillator materials discussed above.

As a class of compounds, π-conjugated polymers typically contain long chains of alternating single and double carbon—carbon bonds and are characterized by overlapping of π orbitals across the formal single bonds. Polyacetylenes, are representative of the class of π-conjugated polymers. Block copolymers, comprising segments of alternating single and double carbon—carbon bonds, and segments containing single carbon—carbon bonds, are also part of the general class comprising π-conjugated polymers. Because of their high electrical resistivities (i.e., $1/\sigma \geq 10^9$ ohm·cm), α-conjugated polymers, and particularly π-conjugated polymers such as polyacetylenes, polyfluorines, polypheneylenes, polypyrrole, polyaniline, polythiophene, and derivatives of the foregoing, such as for example poly(p-phenylenevinylene), poly(2,5-dioctyloxy-p-phenylenevinylene), poly(1-methoxy-4-(2-ethylhexyloxy)-2,5-phenylenevinylene), poly(3,4-ethylene dioxythiophene), and poly(3-octylthiophene), can function as radiation detection materials that exhibit very low leakage currents.

Figure 1:
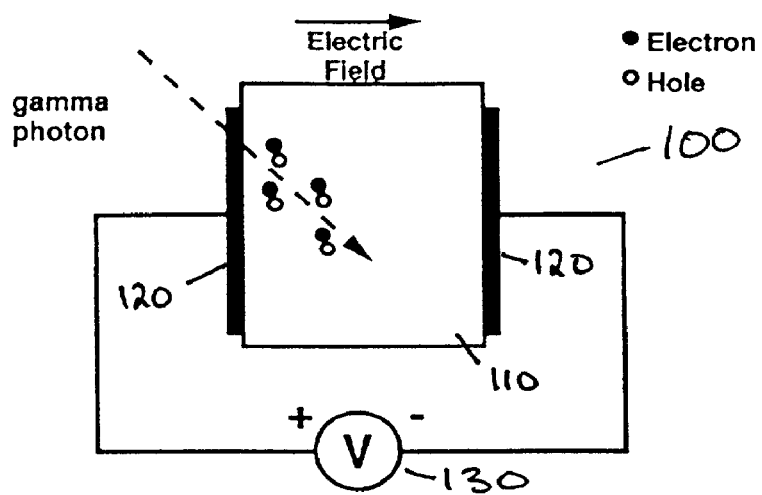
FIG. 1 shows an embodiment of the invention.

The principle and operation of the invention is illustrated and exemplified generally by reference to radiation detection device shown in FIG. 1. The device 100 can be made by forming a layer of a π-conjugated semiconductor material, such as a π-conjugated polymer or polyaromatic hydrocarbon capable of charge transfer reactions, 110 and attaching electrodes 120, that can be metals; conducting oxides, such as indium tin oxide; or electrically conducting polymers, to opposing surfaces. Power supply means 130 for providing an electric field across the semiconducting polymer completes the circuit. Layer 110 can also comprise a mixture of a π-conjugated polymer and another organic polymer to provide desired physical or chemical properties such as greater mechanical strength and formability. An obvious modification of this device is the use of a three electrode geometry as well as depositing polymer material 110 onto the surface of one electrode and subsequently attaching the second electrode to the free surface of the polymer.

Radiation striking semiconducting polymer material 110 forms an electron/hole pair that migrates, under the influence of the electric field, to electrodes 120 and is detected in an external circuit (not shown). The inventors have contemplated depositing a layer of the semiconductor polymer material onto a silicon wafer having prefabricated pulse detection circuitry. The electrode/semiconducting polymer combination can be patterned using any technique familiar to those skilled in the art, such as lithography, shadow masking, or selective deposition.

Figure 2:
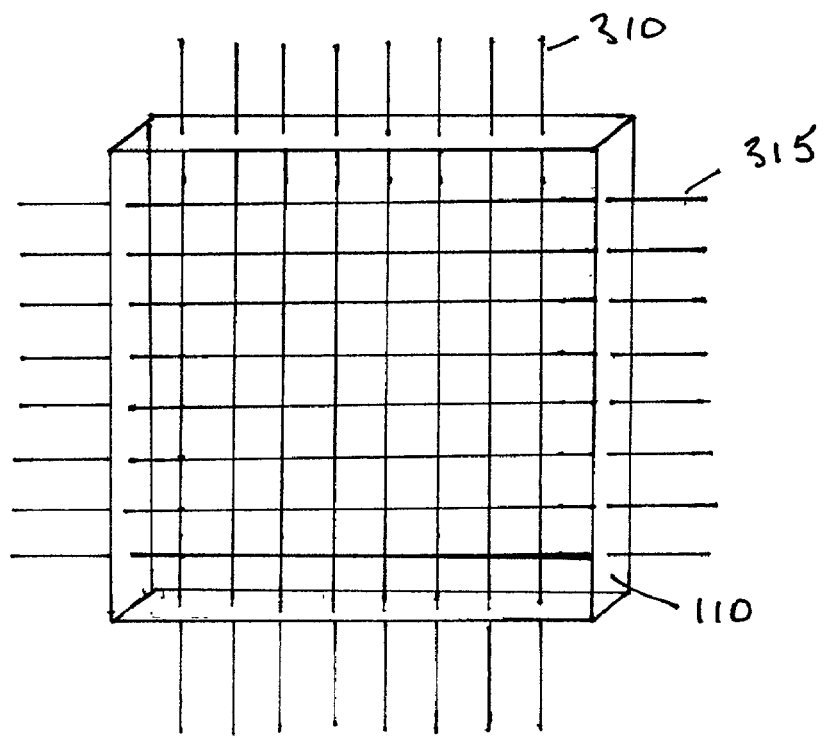
FIG. 2 shows a multi-wire detector array.

The semiconducting polymer layer can be made by methods known to those skilled in the art including spin or drop casting, melt casting, chemical vapor deposition, injection molding, air brush, ink jet printing, extruding, and in-situ polymerization. Further, by using art known methods, a layer of semiconducting polymer material having thicknesses in the range of between about 10 μm to about 100 μm can be easily fabricated. These thin polymer layers and their associated electrodes can be stacked one atop the other thereby providing for multi-layer detector arrangements Because the semiconducting polymers can be cast, it is now possible to make unique radiation detector structures such as illustrated in FIG. 2, which shows an array of wire electrodes 310 and 315 embedded in π-conjugated polymer material 110. The wire array comprises a first set of parallel wires 310 intersecting orthogonally with a second set of parallel wires 315. Each set of wires is supplied w ith a device (not shown) for detecting the signal generated when an electron strikes a wire.

Hydrogen has enhanced sensitivity for neutrons having energies between about 1 MeV to about 10 MeV. However, to successfully track fission neutrons having this range of energies a spatial resolution of about 10 μm to about 100 μm is required. Consequently, by spacing the wire electrodes at a distance of about 10 μm–100 μm apart, the device of FIG. 2 provides a means to track recoil fission neutrons. The ability to detect 1 MeV to 10 MeV fission neutrons is an improvement over prior art radiation detectors which are limited to neutron energies greater than about 14 MeV.

An obvious modification of the device shown in FIG. 2 is a multi-layer geometry, i.e., a plurality of single π-conjugated polymer/wire arrays is stacked to make a three-dimensional structure. As a neutron penetrates through each layer of the multi-layer detector a signal is generated. By knowing the layer number and the location of the signal in the layer, and the signal strength it is now possible to determine the direction the fission neutron is travelling.

Figure 3:
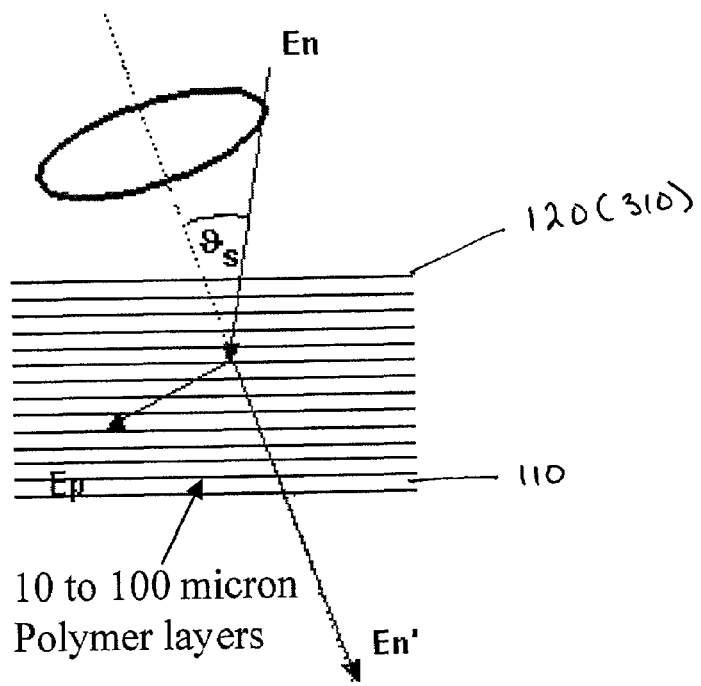
FIG. 3 illustrates the use of a multilayer polymer detector to track radiation.

An example of the use of a multi-layer polymer detector for tracking lower energy particles (i.e., particles having energies between about 1 MeV to 10 MeV) is illustrated in FIG. 3. Electrodes 120 or wire electrodes 310 and 315, spaced between about 10 μm to about 100 μm apart form, in effect, a plurality of π-conjugated polymer layers that are ~10 μm to 100 μm apart and thus, provide the spatial resolution required to track fission electrons having energies over the range of about 1 MeV to 10 MeV.

A second example of the use of a π-conjugated polymer/electrode array, such as that illustrated in FIGS. 1 and 2, provides for detecting (d,t) reactions, an option heretofore unavailable.

In addition to making possible the production of very small devices and three-dimensional devices, the π-conjugated polymer material can be cast into sheets capable of covering large areas, in contrast to prior art semiconductor and crystalline solid radiation detector materials which are limited to an area of a few cm$^2$. These sheets of polymer radiation detector material can be deposited onto flexible electrodes and rolled up to form a radiation detector occupying a small volume but having a large surface area, an application impossible with conventional radiation detector materials.

The ability to produce thin sheets of the π-conjugated polymer materials as well as the ability to produce these materials with the same C:H ratio and density as human skin now makes it possible to produce an electronic tissue equivalent dosimeter. Moreover, by making the tissue equivalent dosimeter as massive as possible it can be made more sensitive. This dosimeter can measure not only the total absorbed dose but also how much tissue damage would be done by the ionizing radiation from the track length of the radiation in the polymer material (dE/dx).

Physical properties of organic polymer molecules, such as electrical resistivity, can be changed by changes in the structure of the polymer. By way of example, when a polymer is crystallized in the absence of an applied external force there is no preferred orientation of the polymer chains. If such an unoriented polymer is subjected to an external stress, typically above the polymer glass transition temperature but below the melting temperature, it undergoes a rearrangement in the direction of the applied stress causing a marked change in physical properties. In addition, the polymer changes from an isotropic to an anisotropic material. In general, a property such as the electrical resistivity decreases in the orientation direction and increases in the direction transverse thereto. Thus, the resistivity of the semiconductor polymer material can be tailored by stretching or generally deforming the polymer.

In addition to changing the resistivity of the semiconducting polymer material by application of stress, it is also possible to enhance the ability of these materials to detect specific radiation by incorporating metals such as aluminum, gallium, lithium, in the form of lithium salts of carboxylates, and boron, in the form of boronic acids, into the polymer structure.

The invention will be illustrated and exemplified by means of the example below.

EXAMPLE

An electrode was prepared by sputtering a 1 μm thick metal film onto a glass substrate. An amount of poly(3-octylthiophene) was dissolved in either toluene or chloroform to form a 10 vol % solution. An inert polymer, such as polystyrene or poly(methyl methacrylate), can be added to the solution (about 10% of the amount of poly(3-octylthiophene)) to improve the mechanical properties of the dried polymer. The solution as spin cast at about 500 RPM onto the electrode surface to form a film about 25 μm to about 100 μm thick and the electrode/polymer composite was baked below 100° C. to remove the solvent. A second electrode was sputtered onto the surface of the organic polymer film to form a radiation detector device. A power supply was attached to the radiation detector structure and a measurement of the device response to alpha radiation was made.

Figure 4:
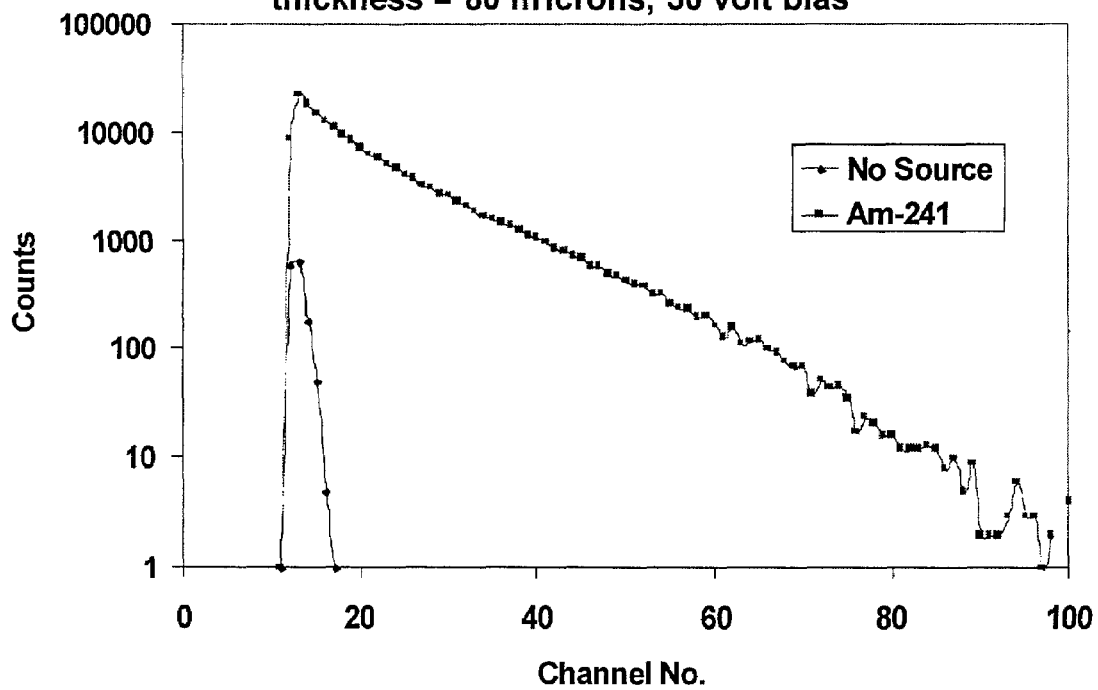
FIG. 4 shows the response of the invention to alpha radiation from $Am^{241}$.

A detector device prepared as in the example above was exposed to alpha radiation from an Am$^{241}$ source and response of the detector was measured. The results are shown in FIG. 4. Very strong signal pulses were recorded at a modest bias voltage (50 V, corresponding to a field of about 10$^6$ V/m). The detector performed well up to bias voltages of 140 V. Above about 200 V, spurious pulses were observed, possibly caused by dielectric breakdown or field emission near the edge of the device. The polymer withstood voltages of over 1000 V with no evidence of permanent damage.

In summary, the present invention is directed to a class of materials, namely π-conjugated materials including polymers, polyaromatic hydrocarbons, and quinolates, which because of their semiconducting properties and high electrical resistivity can be used for radiation detection, and to fabricate radiation detection devices.

We claim:

1. A device for detecting ionizing radiation, comprising: an array of wires embedded in a solid organic semiconducting material consisting essentially of a π-conjugated material having an electrical resistivity of at least 10$^9$ ohm-cm, the array comprising a first plurality of parallel spaced apart wires intersecting orthogonally with a second plurality of parallel spaced apart wires, wherein each wire in the first plurality intersects with each wire in the second plurality; and means for supplying power to the array.

2. The device of claim 1, wherein the wires in each array are spaced at a distance of from 10 μm to 100 μm apart.

3. A device for detecting ionizing radiation, comprising: a plurality of layers joined together to form a multilayer stack, wherein each layer comprises an array of wires embedded in a solid organic semiconducting material consisting essentially of a π-conjugated material having an electrical resistivity of at least 10$^9$ ohm-cm, the array comprising a first plurality of parallel wires intersecting orthogonally with a second plurality of parallel wires; and means for supplying power to each array.

4. The device of claim 3, wherein the wires in each array are spaced at a distance of from 10 μm to 100 μm apart.

5. The device as in any one of claims 1 or 3, wherein the wires are electrically conducting oxides, electrically conducting polymers or combinations thereof.

6. A device for detecting ionizing radiation, comprising:
  a pair of electrodes, each having a length and width, wherein the length is greater than the width;
  a solid organic semiconducting material consisting essentially of a π-conjugated material having an electrical resistivity of at least 10$^9$ ohm-cm disposed between said electrodes, wherein the combination of electrodes and π-conjugated material is rolled up along their length to form a generally cylindrical-shape structure; and
  means for providing power to said electrodes.

7. The device as in any one of claims 1, 3 and 6 wherein an external stress is applied to the π-conjugated material by stretching.

8. The device of claim 7, wherein the external stress is applied at a temperature above the glass transition temperature of the material and below the melting temperature.

9. A device for detecting ionizing radiation, comprising:
electrodes, wherein said electrodes are silicon wafers having prefabricated pulse detection circuitry patterned thereon;
a solid organic semiconducting material consisting essentially of a π-conjugated material having an electrical resistivity of at least $10^9$ ohm-cm disposed between said electrodes; and
power supply means for providing power to said electrodes.

10. The device of as in any one of claims 1, 3, 6, and 9 wherein the π-conjugated material comprises a mixture of π-conjugated materials.

11. The device of claim 10, wherein the π-conjugated material includes π-conjugated polymers having long chains of alternating single and double carbon—carbon bonds, polyaromatic hydrocarbons, or quinolates.

12. The device of claim 11, wherein the π-conjugated polymers are selected from the group of polymers consisting of polyacetylenes, polypyrroles, polyfluorines, and derivatives and combinations thereof.

13. The device of claim 12, wherein the derivative π-conjugated polymer is selected from the list of polymers consisting of poly(1-methoxy-4-(2-ethylhexyloxy)-2,5-phenylenevinylene), poly(2,5-dioctyloxy-p-phenylenevinylene), poly(3,4-ethylene dioxythiophene), and poly(3-octylthiophene), and combinations thereof.

14. The device of claim 11, wherein the polyaromatic hydrocarbons include naphthalene, anthracene, or rubrene.

15. The device of claim 11, wherein the π-conjugated polymers are mixed with organic polymers.

16. The device of claim 15, wherein the organic polymers include polystyrene or poly(methyl methacrylate).

17. The device as in any one of claims 1, 3, 6 and 9 wherein a metal is incorporated into the structure of the π-conjugated material.

18. The device of claim 17, wherein the metal is aluminum, gallium, boron or lithium and salts thereof.

19. A method for detecting ionizing radiation, comprising:
providing an array of wires embedded in a solid organic semiconducting material consisting essentially of a π-conjugated material having an electrical resistivity of at least $10^9$ ohm-cm, the array comprising a first plurality of parallel spaced apart wires intersecting orthogonally with a second plurality of parallel spaced apart wires, wherein each wire in the first plurality intersects with each wire in the second plurality;
supplying electric power to the array;
inserting the array into a radiation field; and
detecting the signal generated when radiation strikes the wires.

20. The method of claim 19, wherein the array is a multilayer array.

21. A method for tracking 1–10 MeV particles, comprising;
providing a plurality of layers, wherein each layer consists of an array of wires embedded in a solid organic semiconducting material consisting essentially of a π-conjugated material having an electrical resistivity of at least $10^9$ ohm-cm, the array comprising a first plurality of parallel spaced apart wires intersecting orthogonally with a second plurality of parallel spaced apart wires, wherein the parallel wires in each array are spaced at a distance of between 10–100 μm apart and wherein each wire in the first plurality intersects with each wire in the second plurality;
supplying electric power to the array;
inserting the array into a radiation field; and
detecting the signal generated when radiation strikes the wires.

22. A method for tracking 1–10 MeV neutrons, comprising:
providing a plurality of layers, wherein each layer consists of an array of wires embedded in a solid organic semiconducting material consisting essentially of a π-conjugated material having an electrical resistivity of at least $10^9$ ohm-cm, the array comprising a first plurality of parallel spaced apart wires intersecting orthogonally with a second plurality of parallel spaced apart wires, wherein the parallel wires in each array are spaced at a distance of between 10–100 μm apart and wherein each wire in the first plurality intersects with each wire in the second plurality;
supplying electric power to the array;
inserting the array into a radiation field; and
detecting the signal generated when radiation strikes the wires.

23. A method for detecting d,t reactions, comprising:
providing a plurality of layers, wherein each layer consists of an array of wires embedded in a solid organic semiconducting material consisting essentially of a π-conjugated material having an electrical resistivity of at least $10^9$ ohm-cm, the array comprising a first plurality of parallel spaced apart wires intersecting orthogonally with a second plurality of parallel spaced apart wires, wherein the parallel wires in each array are spaced at a distance of between 10–100 μm apart and wherein each wire in the first plurality intersects with each wire in the second plurality;
supplying electric power to the array;
inserting the array into a radiation field; and
detecting the signal generated when radiation strikes the wires.

* * * * *